Sept 17, 1957  F. E. WILLIAMS ET AL  2,806,969
HIGH BRIGHTNESS LIGHT SOURCE
Filed June 29, 1954
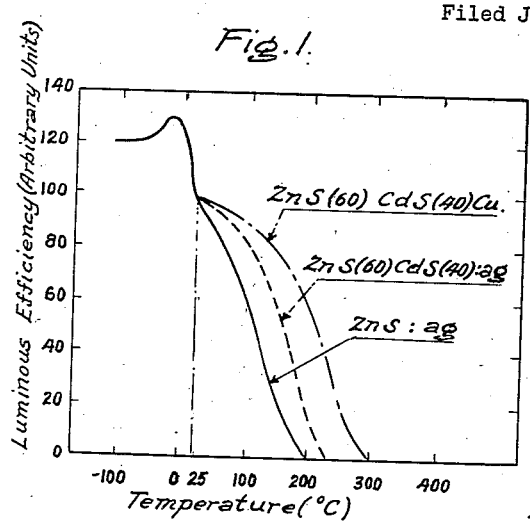
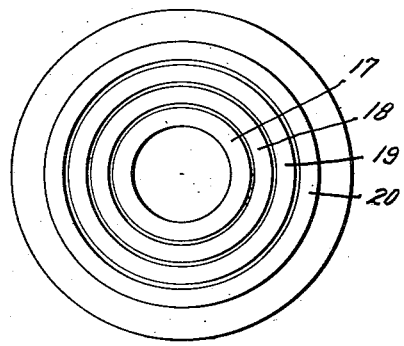
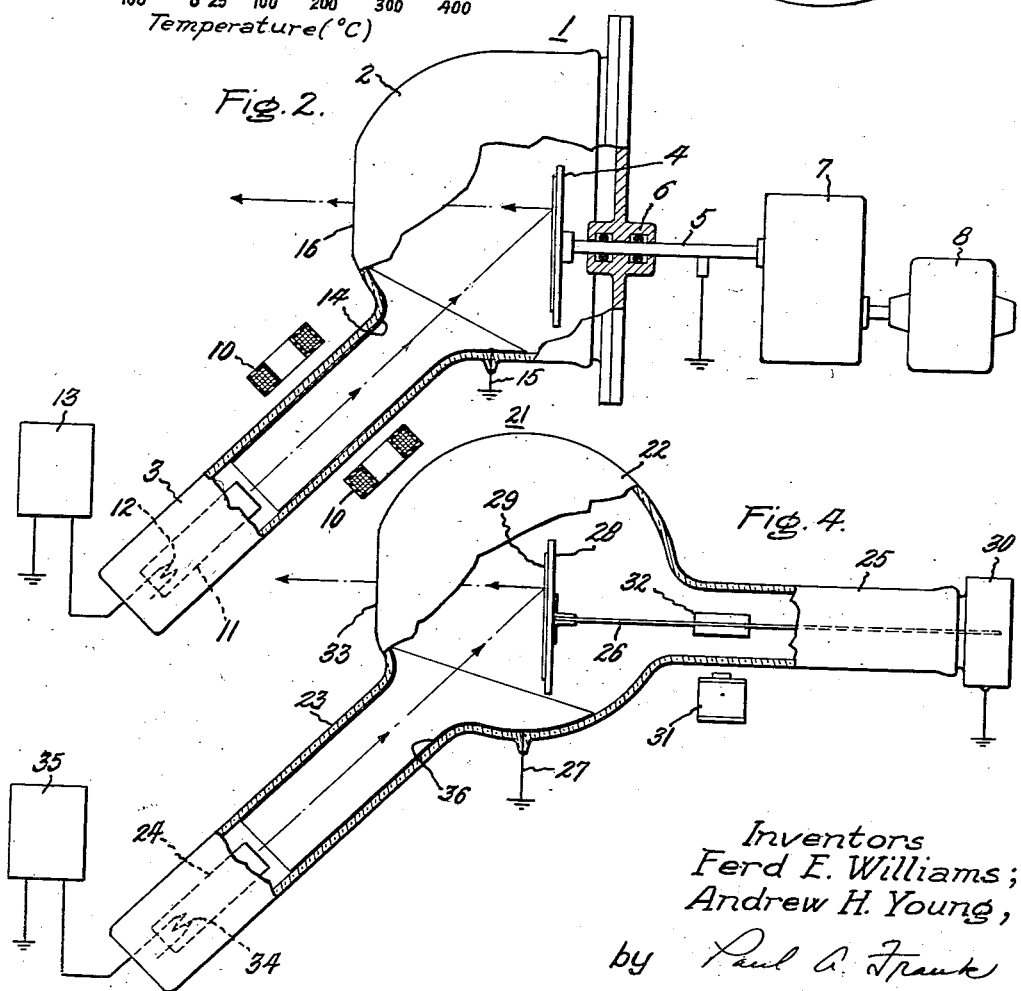
Inventors
Ferd E. Williams;
Andrew H. Young,
by Paul A. Frank
Their Attorney.

United States Patent Office 2,806,969
Patented Sept. 17, 1957

2,806,969

HIGH BRIGHTNESS LIGHT SOURCE

Ferd E. Williams, Schenectady, and Andrew H. Young, Scotia, N. Y., assignors to General Electric Company, a corporation of New York Application June 29, 1954, Serial No. 440,114

3 Claims. (Cl. 313—92)

This invention relates to high brightness light sources which may be modulated at high frequencies. More particularly the invention relates to the production of high brightness light from luminescent solids.

With the development of visual information-portraying systems there has arisen a definite need for a high brightness light source which may be modulated at high frequencies. Presently available high brightness light sources, as for example incandescent lamps and gaseous arcs, cannot be effectively modulated at frequencies above 100 cycles per second. Cathode ray devices, which may be modulated at high frequencies, have been heretofore incapable of producing light of sufficient brightness for many applications.

It is an object of this invention to provide a high brightness light source which may be modulated at high frequencies.

Another object of the invention is to produce a cathodoluminescent light source of high brightness.

According to one feature of the invention, a high brightness light source which may be modulated at high frequencies is produced by directing a high voltage, high current density electron beam upon a moving luminescent screen. The high voltage, high current density electron beam causes the luminescent screen to emit very bright light from a single point in space, while the motion of the screen prevents the high current density from damaging the screen.

The features characteristic of the invention which we believe to be novel are set forth in the appended claims. The invention itself, however, together with further objects and advantages thereof, may best be understood by referring to the following description taken in connection with the accompanying drawing, in which:

Fig. 1 is a graphical representation showing the dependence of the efficiency of luminescence of a number of solid luminescent materials as a function of temperature;

Fig. 2 represents a high intensity light source illustrative of the invention;

Fig. 3 represents a luminescent screen which may be used in the device of Fig. 2; and Fig. 4 represents an alternative embodiment illustrative of a further modification of the invention.

A consideration of the presently available sources of high brightness light and their adaptability to high frequency modulation will emphasize the advantages of the present invention. The carbon arc, which is a common high brightness light source, may not be modulated more rapidly than approximately 60 cycles per second. Incandescent light sources are limited to a frequency of no higher than 10 cycles per second. A neon discharge glow lamp has good frequency responses but produces light of very low brightness. No high brightness light source is presently known which may be modulated at a frequency higher than 100 cycles per second. For the purposes of this specification, all references to high frequency will be understood to mean frequencies in excess of 100 cycles per second.

Cathode ray devices, as presently used, are capable of being modulated at high frequencies, the frequency of modulation being limited only by the decay characteristic of the solid luminescent material used. The phenomena of cathodoluminescence, however, has been heretofore unsuitable for the production of high brightness light because the intensity of illumination which may be derived from known luminescent solids under the excitation of cathode rays is of a relatively low order of magnitude and not suited for many purposes in information portraying systems. The relatively low levels of light intensity obtainable by the bombardment of solid luminescent materials by cathode rays is dependent upon several factors. One important factor which affects the level of light emitted by luminescent solids is the characteristic of luminescent solids which causes a relatively high intensity of illumination only at the instant the solid is first excited by an electron beam. A very short time after a luminescent solid has first been illuminated by an electron beam, the intensity of luminescence falls off rapidly. The reason for this decrease in luminescence is not thoroughly understood, but may be dependent upon instantaneous heating of the luminescent material by the electron beam. Additionally, when an electron beam of any substantial current density is directed at a luminescent material for any substantial length of time, exceeding several seconds, the energy of the incident electrons causes a marked heating of the luminescent screen of the order of several hundred degrees centigrade. This heating, due to long-time excitation by cathode rays, causes a very marked decrease in the efficiency of a luminescent screen. This decrease in efficiency is shown graphically in Fig. 1 wherein the efficiency of luminescence of several typical phosphors is shown as a function of temperature. As may be noted, with a rise in temperature of only approximately 100 degrees over ambient room temperature, the efficiency of illumination of luminescent phosphors falls off a factor of approximately 50%.

A further factor limiting the intensity of light emitted by luminescent screens is that, in addition to the reduced efficiency of a luminescent screen after bombardment by a cathode ray for any appreciable time, continuous bombardment of a luminescent screen by an electron beam of any appreciable current density will cause destruction of the screen in a very short time. This destruction of a luminescent screen by high intensity electron bombardment is due to the lack of opportunity for heat to be dissipated from the screen as long as the cathode rays continually bombard the same portion of the screen. To illustrate this limitation, it has been found experimentally that the maximum amount of radiation which may be borne by a typical cathodoluminescent screen comprising, for example, a zinc sulfide phosphor is approximately 0.01 watt per square millimeter. This amount of incident cathode ray energy is represented by a corresponding light intensity of approximately 0.03 candle per square millimeter. This value is not indicative of high intensity light, but, however, is approximately the maximum intensity of illumination which may be obtained from a fixed zinc sulfide luminescent screen under bombardment of stationary cathode rays.

The above considerations are directed to the situation in which a beam of cathode rays is incident upon a cathodoluminescent screen at one point so that a source of light is created which is fixed at a particular point in space. In conventional cathode ray and television picture tubes, the low maximum intensity of light obtainable does not cause serious problems, as the intensity of light needed to project a picture upon a screen is relatively low. Additionally, the problem of continuous bombardment of a luminescent screen causing damage thereto is met in conventional cathode ray tubes by causing the electron beam to scan the luminescent screen so that the cathode beam is incident upon a particular spot upon the screen only a very minute fraction of the total time that the screen is in operation. This results in each discrete portion of the screen having sufficient time to dissipate the heat due to initial bombardment before it is again bombarded by cathode rays causing luminescence. While scanning of a luminescent screen by an electron beam is satisfactory for the production of a picture or signal of low brightness, it cannot be used where it is desired to have a high brightness light source located at a fixed point in space. Thus, when a high brightness light source is desired at a fixed point in space, the conventional cathode ray tube arrangement with a fixed screen and a cathode ray beam sweeping over the face of the screen is not suitable; and if the beam is maintained fixed upon a particular point upon the screen the allowable current densities are necessarily restricted to such values that high brightness light may not be obtained from the luminescent screen.

We have found that the above-mentioned difficulties may be overcome and a high brightness light source adaptable to modulation at high frequencies, namely frequencies in excess of 100 cycles per second, may be obtained if a high voltage, high current density electron beam is caused to fall upon a luminescent screen which is maintained in continuous motion transverse to the axis of the beam. In such an arrangement the hereinbefore described characteristics of luminescent solids are utilized so that very high efficiencies are obtained. For example, since the cathode ray beam is continually exciting portions of the moving luminescent screen which were previously unexcited, the initially high excitation efficiency of the solid is obtained. By the time the initial excitation level would begin to decrease, the particular portion of the luminescent screen has passed through the beam and is no longer under excitation. Additionally, since each portion of the moving luminescent screen is excited by the electron beam for only an extremely short period of time, very high current densities may be maintained without causing heating of the screen and a consequent lowering of the efficiency of the screen as a source of luminescent energy. The rapid motion of the screen transverse to the electron beam has the additional advantage in allowing any slight heating effects which may have been generated by the incident electron beam to be dissipated by the time a discrete portion of the screen is again excited by passing through the electron beam.

In Fig. 2 of the drawing there is shown a device illustrative of one embodiment of the invention.

The device of Fig. 2 comprises an evacuable envelope 1, which may include a substantially hemispherical portion 2 and a neck portion 3, and a disc shaped luminescent screen 4, mounted upon axle 5. Axle 5 is rotatably mounted in and passes through vacuum tight bearing seal 6, into gear box 7. Motor 8 supplies motive power to axle 6 through gear box 7 to impart rotational motion to disc shaped, luminescent screen 4.

Neck portion 3 of tube envelope 1 may be disposed at an angle of, for example, approximately 45° to the plane of disc 4 with its axis aligned with a point on screen 4 midway between the far edge and the center thereof. Magnetic deflection coils 10 may be located adjacent neck portion 3 of tube envelope 1. An electron beam forming and focusing means which may be electron gun 11 is located within neck portion 3 of bulb envelope 1. Cathode 12 of electron gun 11 is maintained at the proper operating voltage by adjustable power supply 13. Accelerating potential for the device is applied to a conductive coating 14, applied to the interior of neck portion 3 and part of hemispherical portion 2 of tube envelope 1. Electrical contact to coating 14 is made by means of terminal 15. Conductive coating 14 may conveniently be a colloidal suspension of graphite well known to the art as aquadag, or any similar conductive substance.

In the operation of the device of Fig. 2, a high negative potential which may conveniently be from 15 to 50 kilovolts is applied to cathode 12 of electron gun 11. The interior conductive coating 14 of tube 1 is maintained at ground potential by means of terminal 15. Luminescent screen 4 is also maintained at ground potential in order to create a high accelerating potential between the cathode 12 of electron gun 11 and luminescent screen 4. Luminescent screen 4 is preferably substantially parallel with a transparent portion 16 of the substantially hemispherical portion 2 of bulb envelope 1. This configuration affords maximum transmission of light radiated from luminescent screen 4.

In Fig. 3 a plan view of luminescent screen 4 is shown. As may be seen, luminescent screen 4 may comprise a circular disc which may be coated with one or more annular concentric rings of luminescent phosphors. Some suitable luminescent phosphors which may be used are zinc sulfide, zinc oxide, and cadmium sulfide. These phosphors are given by way of example only, for any cathodoluminescent substance may be used. In this embodiment there is shown a series of concentric annular portions 17, 18, 19 and 20. Luminescent screen 4 is rotated by motor 8 through gear train 7 and axle 5 about the common center of the concentric rings. Although the electron beam passing from electron gun 11 to luminescent screen 4 does not scan screen 4 as does the electron beam in a conventional cathode ray or television viewing tube, the electron beam may be deflected through a small angle so that its point of incidence upon disc screen 4 may be made to fall upon a selected phosphor ring. A plurality of phosphor rings 17, 18, 19 and 20 may be chosen to emit light of varying visible spectral distribution, giving rise to different color illumination. In practice, the electron beam may be deflected by deflection coils 10 to impinge upon any preselected phosphor ring.

In operation, a high negative potential which may conveniently be of the order of from 15 to 50 kilovolts is applied to the cathode 12 of electron gun 11, while conductive coating 14 within tube 1 and luminescent screen 4 are maintained at ground potential. A beam of electrons is formed and focused by electron gun 11 and, under the influence of the accelerating field, passes through tube 1 impinging upon screen 4 which is rotated at a preselected speed by driving motor 8. Since the increased efficiencies of the device herein described depend upon the principle of exciting the luminescent phosphors for extremely short intervals to prevent heating and, consequently, decreased emission and damage to the phosphor screen, the speed of rotation of screen 4 is governed by many factors. These factors include beam voltage, beam current density, and the brightness desired. The product of beam voltage and beam current density yields the excitation energy density, or the energy incident upon the screen. A limiting factor governing the operation of the device is that the energy falling upon any signal portion of the screen must be less than that energy which will cause excess heating or burning of the screen. This value will vary with the particular luminescent material used, and with the physical structure of the screen; however, in general, high excitation energies may be used upon a rapidly moving screen. Conversely, when a low energy density beam is used, a lower rate of screen motion may be employed. According to this principle the product of excitation energy density and excitation time will yield the energy input to a discrete portion of the screen.

Satisfactory brightness has been obtained from the device of Fig. 2 for values of energy input ranging from 100 to 1300 joules per square millimeter. These values, as with the values of Table I, are not intended to limit the scope of the appended claims but rather to give examples of the values which may be used in practicing the invention.

Table I

| Phosphor | Beam voltage (kv.) | Current density (ma./mm.$^2$) | Excitation energy density (watts/mm.$^2$) | Excitation time (sec.) | Brightness (c./mm.$^2$) | Eff., c./watt |
|---|---|---|---|---|---|---|
| ZnO | 20 | 5.3 | 0.106 | 930 | 0.31 | 2.92 |
|  | 15 | 290 | 4.35 | 70 | 5.6 | 1.28 |
| ZnS:Cu (0.3%) | 20 | 1,170 | 23.4 | 40 | 74 | 3.15 |
|  | 28 | 1,170 | 32.8 | 40 | 117 | 3.57 |
| ZnS:Cu (1%) | 20 | 510 | 10.2 | 120 | 13.5 | 1.32 |

Calculations of efficiency of conversion of electrical energy into luminescent energy show ratings as high as 3.57 candles per watt. This transformation of electrical energy into luminescent energy is comparable to a maximum theoretical conversion of approximately 20 candles per watt, or an efficiency of 18.3% as comparable to the efficiency of the conventional cathode ray devices which have a maximum conversion efficiency of approximately 5 to 10%. Excitation of the particular phosphor upon which the beam is incident causes the emission of a high intensity light of preselected wavelength or spectral distribution. Light from luminescent screen 4 is transmitted through transparent portion 16 of tube 1 which may include lens means for sharply focusing the emitted light. Since the radiation from screen 4 is viewed from the side of the screen upon which the electron beam is incident, there is obtainable a much higher brightness than would be in the normal cathode ray tube viewing screen wherein luminescence is viewed from the side of the screen opposite the incident electron beam. Light emitted from luminescent screen 4 under bombardment of an electron beam generated by electron gun 11 may be modulated at frequencies up to the megacycle range by applying a modulating signal to a modulating electrode located within electron gun 11.

In Fig. 4 of the drawing, there is shown an alternative embodiment of the invention. In the device of Fig. 4, the tube 21 may comprise a spherical center section 22 and a neck piece 23 within which is located electron gun 24 and a second neck piece 25 within which is located stem piece 26 upon which luminescent screen 28 is mounted. Neck piece 23 is disposed at approximately a 45° angle with respect to the axis of neck piece 25. The cathode 34 of electron gun 24 is maintained at a high negative potential by means of power supply 35, while an interior conductive coating 36 on interior of neck piece 23 and a portion of the center spherical piece 22 of tube 21 is maintained at ground potential by means of anode terminal 27. Luminescent screen 28 is also maintained at ground potential by means of anode connection 30. Luminescent screen 28 is coated with a luminescent phosphor material 29 which emits light when excited by cathode rays. Screen 28 may be moved transversely through the beam of electrons from electron gun 24 by means of a solenoid 31 which alternately attracts and releases magnetic armature 32 mounted within neck piece 25. In operation, a high negative potential is applied to the cathode of electron gun 24 causing an electron beam to be emitted and focused upon luminescent screen 28. Luminescent screen 28 is continuously vibrated by solenoid 31 acting in conjunction with magnetic armature 32 causing screen 28 to traverse the electron beam causing continuous excitation of different portions of screen 28. The frequency of vibration of screen 28 is adjusted to give the excitation energy value desirable in accordance with the principles described with respect to the device of Fig. 2. The exact frequency depends upon the chosen values of beam voltage, beam current density and desired brightness. Light emitted from luminescent screen 28 passes through transparent portion 33 of spherical tube portion 22 and may at that point be focused, giving rise to a high intensity light source which may be modulated at high frequencies.

It will be appreciated that, although we have described specific embodiments of the invention, many modifications may be made, and we intend by the appended claims to cover all such modifications as fall within the true spirit and scope of the invention.

What we claim as new and desire to secure by Letters Patent of the United States is:

1. A high brightness light source comprising an evacuable envelope, a luminescent screen within said envelope comprising a rotatable disc having thereon a plurality of concentric annular portions each coated with a different wavelength light emitting cathodoluminescent phosphor, means within the evacuable envelope for producing a beam of electrons, means for focusing the beam of electrons upon the luminescent screen, means for controlling the deflection of said beam, and means for rotating the luminescent screen through the electron beam and means for modulating said electron beam.

2. A high brightness light source capable of producing high intensity light of differing wavelengths and comprising an evacuable envelope, a luminescent screen within said envelope, said screen including a rotatable disc having thereon a luminescent film in the form of concentric annular portions each of said portions comprising a phosphor which emits a different wavelength of visible light when excited by an electron beam, means within said envelope for producing a beam of electrons, means for focusing said beam upon said luminescent screen and beam deflection means for selectively maintaining said beam in a preselected deflected position whereby said beam may be caused to selectively excite one of said concentric annular portions of said luminescent screen to emit light of a preselected wavelength.

3. A high brightness light source capable of being modulated at high frequencies and producing high intensity light of differing wavelengths, comprising an evacuable envelope, a luminescent screen within said envelope, said screen including a rotatable disc having thereon a luminescent film in the form of concentric annular portions, each of said portions comprising a phosphor which emits a different wavelength of light when excited by an electron beam, means within said envelope for producing a beam of electrons, means for focusing said beam upon said luminescent screen, means for deflecting said beam to selectively maintain said beam in a preselected deflected position whereby said beam may be caused to selectively excite any of said concentric annular portions to emit light of a preselected wavelength, and means for modulating said electron beam.

References Cited in the file of this patent

UNITED STATES PATENTS

| | | |
|---|---|---|
| 2,086,718 | Knoll | July 13, 1937 |
| 2,203,353 | Goldmark | June 4, 1940 |
| 2,233,037 | Smith | Feb. 25, 1941 |
| 2,330,682 | Clothier et al. | Sept. 28, 1943 |
| 2,585,846 | Rosenthal et al. | Feb. 12, 1952 |